United States Patent
Baker

(10) Patent No.: US 6,315,264 B1
(45) Date of Patent: *Nov. 13, 2001

(54) FAST-CLOSING STEPPING ACTUATOR FOR A VALVE MEMBER

(76) Inventor: Gerald Baker, 10610 Olympia, Houston, TX (US) 77042

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/245,982

(22) Filed: Feb. 5, 1999

(51) Int. Cl.[7] ............................ F16K 31/72; F16K 31/04
(52) U.S. Cl. ........................................ 251/14; 251/129.03
(58) Field of Search ....................... 251/14, 129, 129.11, 251/129.12, 129.13, 129.03, 249.5, 266, 267; 74/2, 424.8 VA

(56) References Cited

U.S. PATENT DOCUMENTS

| | | | |
|---|---|---|---|
| 1,466,945 | 9/1923 | Bendix | 74/7 R |
| 1,784,094 | 12/1930 | Fletcher | 251/229 |
| 2,327,980 | 8/1943 | Bryant | 251/248 X |
| 2,930,571 | 3/1960 | Vogl | 74/424.8 VA X |
| 3,168,841 | 2/1965 | Caldwell et al. | 74/625 |
| 3,488,030 | * 1/1970 | Hulme et al. | 251/129.12 |
| 3,512,421 | 5/1970 | Anderson | 74/2 X |
| 3,518,891 | 7/1970 | Denkowski | 74/424.8 R X |
| 3,533,595 | * 10/1970 | Gizeski | 251/129.03 X |
| 3,640,140 | 2/1972 | Gulick et al. | 74/424.8 VA X |
| 3,889,924 | 6/1975 | Karpenko | 251/249.5 |
| 3,921,264 | 11/1975 | Madonian et al. | 475/154 |
| 3,955,792 | 5/1976 | Cho | 251/69 |
| 4,082,247 | 4/1978 | Dalton | 251/229 |

(List continued on next page.)

FOREIGN PATENT DOCUMENTS

| | | |
|---|---|---|
| 51213 | 11/1992 | (EP) . |
| 785188 | 10/1957 | (GB) . |
| 1141082 | 1/1969 | (GB) . |
| 1186767 | 4/1970 | (GB) . |
| 1340570 | 12/1973 | (GB) . |
| 2243669 | 11/1991 | (GB) . |
| 2283061 | 4/1995 | (GB) . |
| WO 80/00483 | 3/1980 | (WO) . |
| WO 96/04494 | 2/1996 | (WO) . |

OTHER PUBLICATIONS

EP 512139 (Heinz Pour) Nov. 22, 1992 (abstract).[online] [retrieved on Aug. 23, 2000]. Retrieved from Derwent Database.*

Guiberson AVA Dresser, Model 'SRM' Safety Release Manual Actuator, 5 pages, date unknown.

Baker Oil Tools, Maintenance and Operating Instructions for Model "CSWC" Coil Spring, High Thrust Wire–Cutting Actuator, 6 pages, Nov. 5, 1993.

Otis Engineering Corporation, Guide to Otis Surface Safety Valve Actuators and Accessories, 1 page, Feb. 1993.

Axelson, Axelson Type HC Actuator, 2 pages, date unknown.

Baker Oil Tools, Pneumatic and Hydraulic Actuator drawings, 5 pages.

Primary Examiner—Charles A Marmor
Assistant Examiner—Ankur Parekh

(57) ABSTRACT

An actuation system is usable for a choke. The choke can be moved between open and closed positions by a variety of devices, including a stepping actuator. A rapid shutdown feature involving a hydraulically driven override allows the stem of the choke to be moved rapidly to close the choke. The actuator resumes its old position when the hydraulic shutdown mode is overridden, thus allowing the choke to return to its prior position before it was rapidly closed. Shutdown of the choke is rapid, while a return to its former position is gradual.

19 Claims, 9 Drawing Sheets

U.S. PATENT DOCUMENTS

| | | | |
|---|---|---|---|
| 4,090,589 | 5/1978 | Fitzwater | 251/54 X |
| 4,130,030 | 12/1978 | Stratienko | 251/129.11 X |
| 4,189,950 | 2/1980 | Killian | 74/424.8 VA X |
| 4,256,065 | 3/1981 | Hirt | 74/424.8 VA X |
| 4,273,307 | 6/1981 | Malinski et al. | 251/69 X |
| 4,285,496 * | 8/1981 | Coles | 251/129.03 |
| 4,289,038 | 9/1981 | Hore | 74/2 |
| 4,323,221 | 4/1982 | Krober et al. | 251/58 |
| 4,436,278 | 3/1984 | Smith | 251/129.03 X |
| 4,460,154 * | 7/1984 | Kunkle | 251/14 X |
| 4,461,450 * | 7/1984 | Soland et al. | 251/63.5 |
| 4,651,969 | 3/1987 | Dowdall | 251/14 |
| 4,741,508 | 5/1988 | Fukamachi | 251/129.12 X |
| 4,749,004 | 6/1988 | Peash | 251/129.13 X |
| 4,771,643 | 9/1988 | Mott | 74/424.8 VA X |
| 4,771,807 * | 9/1988 | Karani | 251/129.03 X |
| 4,920,811 | 5/1990 | Hopper | 74/2 |
| 4,920,816 | 5/1990 | Inabe et al. | 74/424.8 VA X |
| 5,094,426 * | 3/1992 | Zajac | 251/14 |
| 5,195,721 | 3/1993 | Akkerman | 74/424.8 VA X |
| 5,351,935 * | 10/1994 | Miyoshi et al. | 251/129.11 |
| 5,364,066 * | 11/1994 | Dorste et al. | 251/129.11 X |
| 5,497,672 | 3/1996 | Appleford et al. | 74/424.8 VA X |
| 5,560,586 * | 10/1996 | Aruga et al. | 251/129.11 X |

* cited by examiner

FAST-CLOSING STEPPING ACTUATOR FOR A VALVE MEMBER

FIELD OF THE INVENTION

The field of this invention relates to actuators with incremental movement capabilities such as by a stepper motor, and more particularly to applications involving the use of such actuators for chokes where fast closure is desirable.

BACKGROUND OF THE INVENTION

Various types of valves used in the oil and gas industry are operated by actuators. Chokes are a particular type of valve and are generally used as throttling devices to reduce downstream pressures or flow rates or regulate them to a predetermined set point or range of pressures or flow rates. Normally, other types of valves are in the system in which the choke is installed. Occasions can arise where it is necessary to obtain rapid closure of the particular system in which the choke is installed. Chokes have traditionally been operated by stepping actuators which allow for fine adjustment on the degree of opening of the chokes for control of the flowing liquid or gas stream. When a rapid shutdown has been required in the past, the stepping actuator was actuated in reverse. The problem with that mode of operation is that it took too long to close the choke, thus allowing the possibility of erosion damage to valves further downstream, which could see the effects of increased velocity until the choke could be closed fully, using the stepping actuator.

Yet other techniques would be to use hydraulically actuated motors and disable the stepping actuator drive mechanism and drive the stem under power of a hydraulic motor. The problem with these designs has been that the motor torque output of a hydraulic motor has to be carefully controlled or else it would apply potentially significant torques which could twist the stem completely, making the choke inoperable for further operations. Another shortcoming of using the hydraulic motor to actuate the stem for a rapid shutdown of the choke would be that hydraulic motors require high pressures and volume in the hydraulic pressure source. This entails the adaptation of a complex hydraulic system in order to make such a design functional for each individual actuator-operated choke.

One of the objectives of the present invention is to provide a simple mechanism which can rapidly close the choke when the situation warrants, yet still have the positional accuracy afforded by a stepping actuator. Another objective is to allow the choke to resume its old position at the time it was actuated for rapid closure after the situation requiring the closure has been corrected. This would, in turn, allow the system to stabilize because the old settings could be easily resumed. Yet another objective of the present invention is to provide the rapid closure function with a hydraulic system that employs high pressure but low volume, thus giving the potential for using seawater for the fluid medium for accomplishing rapid closure. Yet another objective of the present invention is to allow for rapid actuation of the actuator to close the choke, using the hydraulically operated assist, while at the same time allowing the choke to reopen at a more gradual rate to prevent damage to downstream equipment. These and other features of the present invention will be more readily appreciated by those skilled in the art from a review of the preferred and an alternative embodiment described in detail below.

SUMMARY OF THE INVENTION

An actuation system is usable for a choke. The choke can be moved between open and closed positions by a variety of devices, including a stepping actuator. A rapid shutdown feature involving a hydraulically driven override allows the stem of the choke to be moved rapidly to close the choke. The actuator resumes its old position when the hydraulic shutdown mode is overridden, thus allowing the choke to return to its prior position before it was rapidly closed. Shutdown of the choke is rapid, while a return to its former position is gradual.

DETAILED DESCRIPTION OF THE PREFERRED EMBODIMENT

Figure 1:
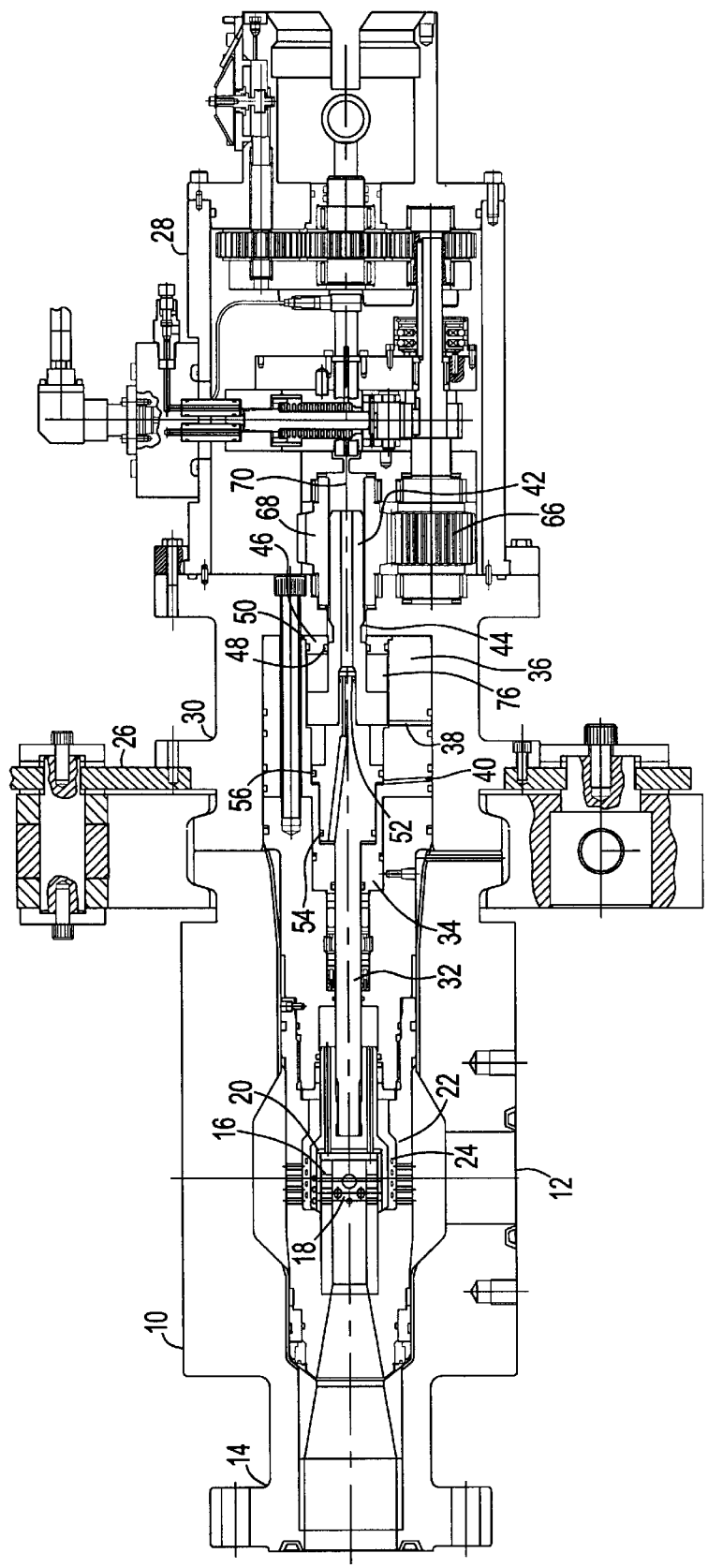
FIG. 1 is a sectional elevational view of the preferred embodiment, shown in a position where it is stepped fully closed.
Figure 2:
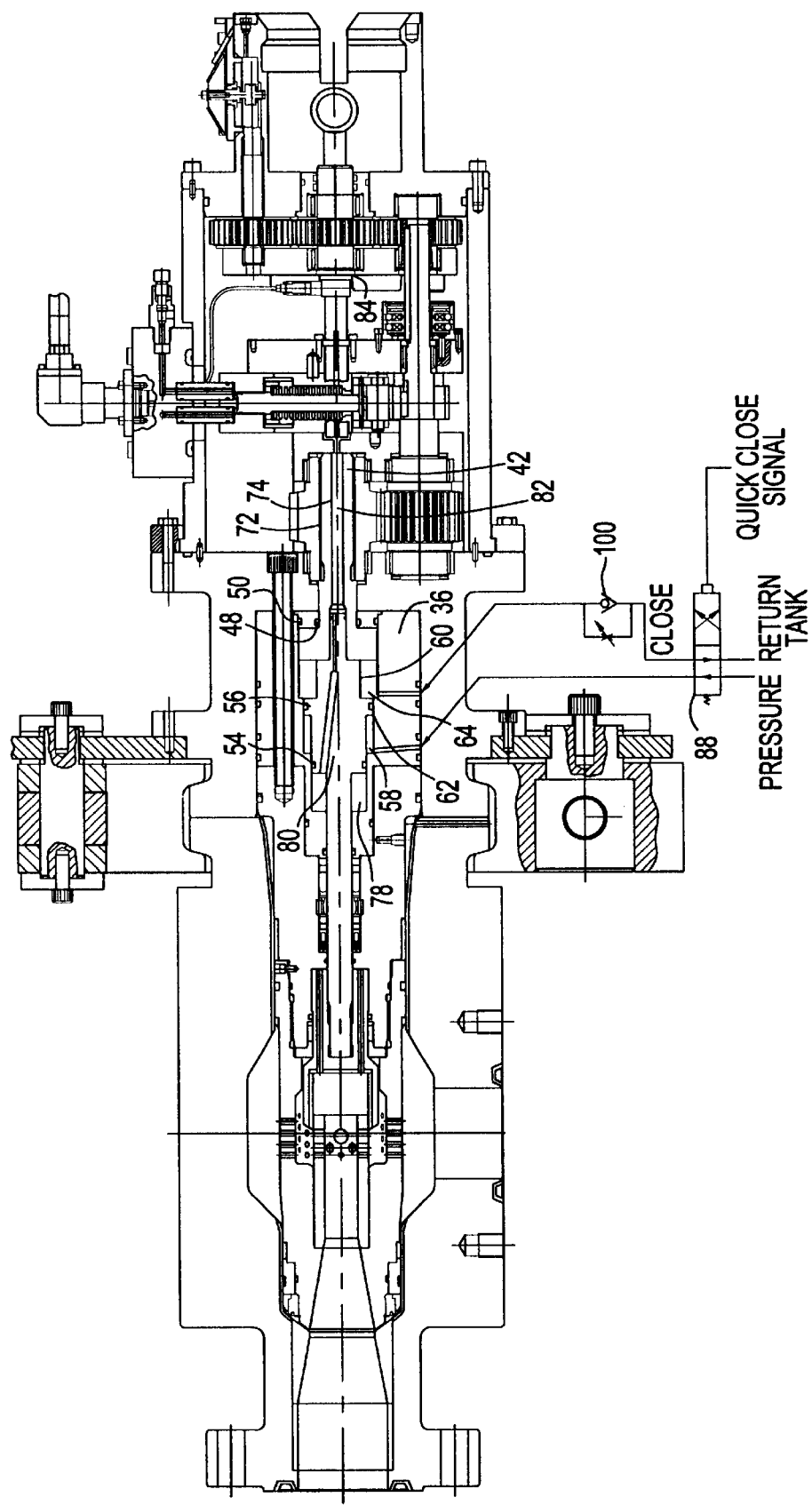
FIG. 2 is the view of FIG. 1, with the choke stepped fully open.

Referring to FIG. 1, a choke body 10 has an inlet 12 and an outlet 14. A cage 16 has a plurality of openings 18. Movable sleeve 20 is shown covering openings 18 in FIG. 1, representing the fully closed position which prevents all fluid communication between inlet 12 and outlet 14. Stationary sleeve 22 has openings 24. Openings 24 can communicate with openings 18 when the movable sleeve 20 is upwardly retracted, as shown in FIG. 2. Sleeve 22 can be removed out of body 10 in a manner known in the art by releasing clamp 26 and pulling the actuator 28. Actuator 28 is a stepper-type actuator used in choke service in the past and constitutes a design that is well-known in the art. The actuator 28 is attached to the body 10 through a sleeve 30. Clamp 26 holds sleeve 30 to body 10. Within sleeve 30 is an actuator rod 32 which is affixed to sliding sleeve 20 at one end. Actuator rod 32 extends through an opening 34 in hydraulic housing 36. Hydraulic housing 36 has passages 38 and 40 for selective application of fluid pressure for actuation of actuator rod 32. Abutting the actuator rod 32 is a stepper shaft 42, which extends through an opening 44 in sleeve 30. Plate 46 seals off opening 44 by virtue of O-ring seals 48 and 50. O-ring seal 52 seals between actuator rod 32 and stepper shaft 42. O-ring seals 54 and 56 seal between the actuator rod 32 and the hydraulic housing 36. As better shown in FIG. 2, O-ring seals 54 and 56 define an annular cavity 58, which is in fluid communication with passage 40 for selective application of hydraulic or other fluid as will be described below. Similarly, O-ring 56, in conjunction with O-rings 48 and 50, defines another annular cavity 60. Those skilled in the art will appreciate that pressure in cavity 58 acts on surface 62 while pressure in cavity 60 acts on surface 64. Surfaces 62 and 64 oppose each other, thus defining how movement of actuator rod 32 will occur for quick movements of sleeve 20.

The actuator 28 has an output gear 66 which is meshed with drive gear 68. Drive gear 68 has a bore 70 therethrough, within which is a driving thread 72. Driving thread 72 meshes with a similar thread 74 such that rotation of gear 68 by output gear 66 results in translation of stepper shaft 42. Stepper shaft 42 is keyed to hydraulic housing 36 by virtue of its extension into splines 76 in hydraulic housing 36. Accordingly, those skilled in the art will appreciate that the normal stepping operation between fully closed in FIG. 1 and fully open in FIG. 2 occurs by rotation of the gear 66 in opposed directions. As shown in FIGS. 1 and 2, in stepping the sleeve 20 from the full open to full closed positions, the stepper shaft 42 drives the actuator rod 32, overcoming hydraulic pressure which is continuously applied during normal operations to passage 40. During reverse stepping motion, where gear 66 drives gear 68, making stepper shaft 42 move in an upward direction out of body 10, the constant application of hydraulic pressure to passage 40 forces the actuator rod 32 to follow the movement of the stepper shaft 42.

In order to allow the above-described movements, annular passage 78 is vented through passage 80 through passage 82 in stepper shaft 42 to an accumulator 84 within the actuator 28. Thus, when movement with stepping action between the full open position of FIG. 2 to the full closed position of FIG. 1, the volume of annular chamber 78 is reduced and fluid is displaced through passages 80 and 82 to the accumulator 84. The reverse flow occurs when moving from the closed to the open position shown, respectively, in FIGS. 1 and 2.

It should be noted that the actuator rod 32 does not rotate but merely translates with the stepper shaft 42, as described previously. Thus, O-ring seal 38 between them experiences no relative rotation.

Figure 8:
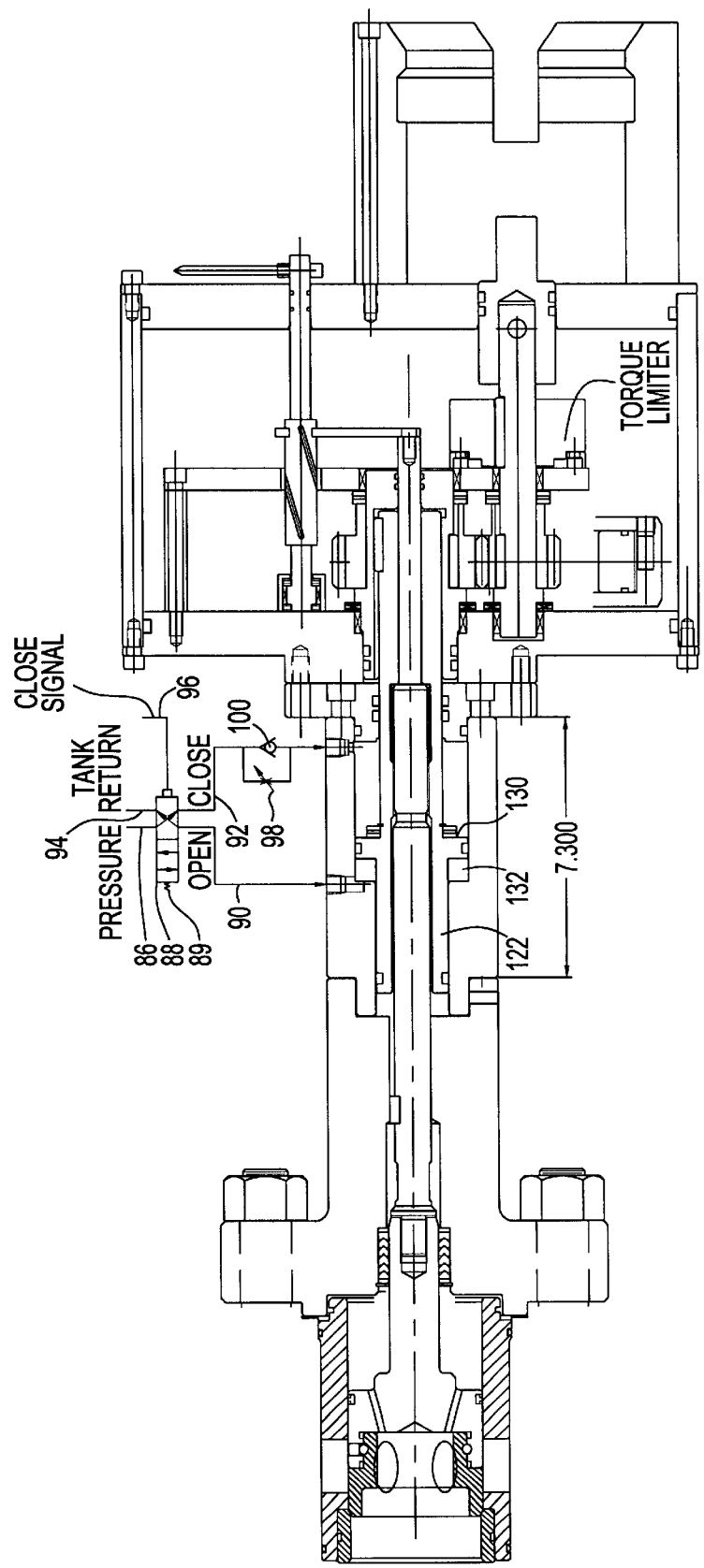
FIG. 8 is the view of FIG. 7, with the choke being quickly closed after having been stepped fully open.
Figure 9:
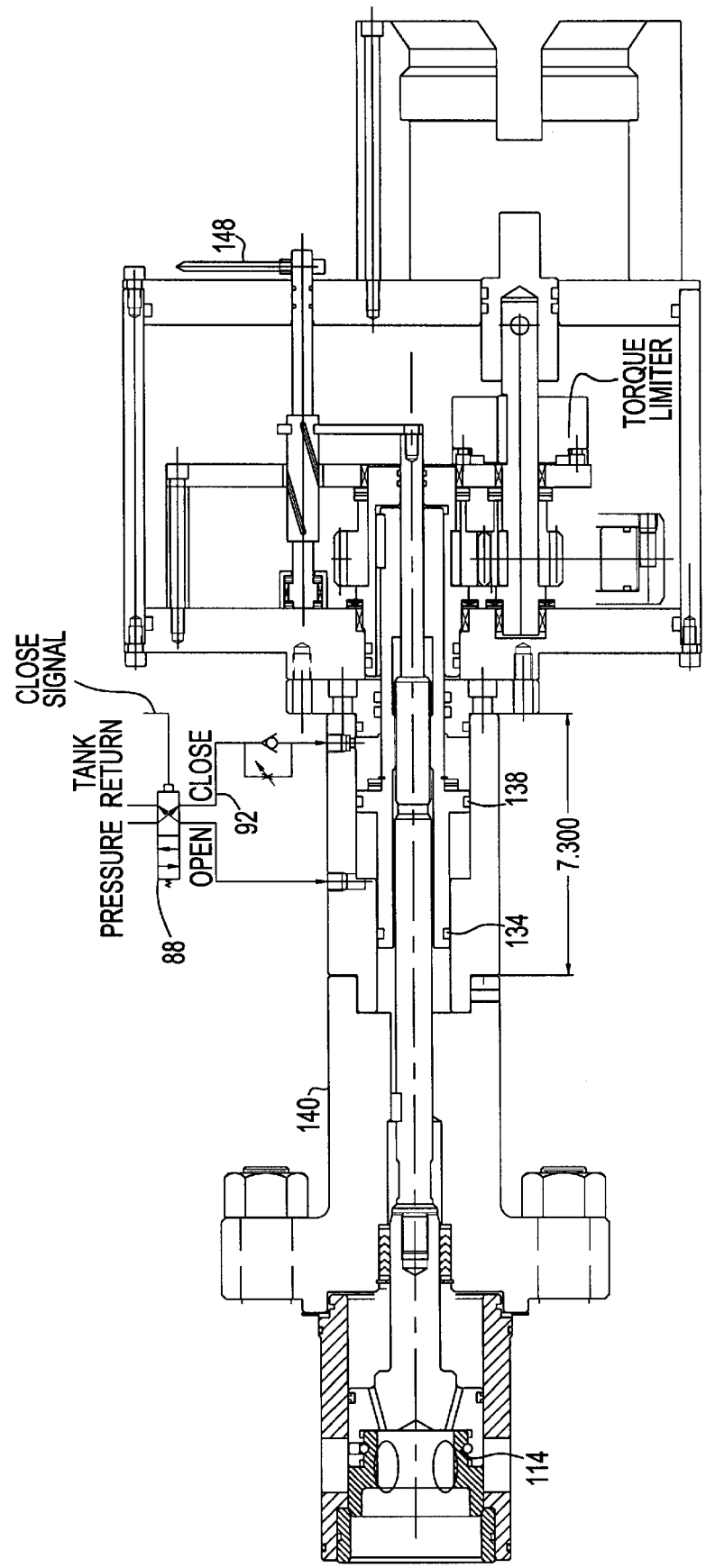
FIG. 9 is the view of FIG. 6, with the choke being rapidly closed after being stepped half-closed.

The hydraulic control system, which is connected to passages 40 and 38, is illustrated in FIG. 8 which, although describing an alternative internal embodiment, employs the exact same control system. A high-pressure, low-volume source 86, which can be hydraulic fluid from an existing system or surrounding seawater pumped to the requisite pressure for the selective actuation of actuator rod 32, is connected to a diverter valve 88. Valve 88 has lines 90, 92 and 94 connected to it. Line 94 is connected to a low-pressure supply for the hydraulic system (not shown). Ultimately, a pump (not shown) builds the pressure up and delivers it as the hydraulic pressure source 86. The two positions of the diverter valve 88 are shown in FIGS. 5 and 8. A signal, represented by line 96, can be used to move the diverter valve between the positions shown in FIGS. 5 and 8. In FIG. 8, the high-pressure hydraulic source crosses over to line 92, while the return to the sump (not shown) is connected to line 90. In the FIG. 5 position, the hydraulic pressure source 86 goes directly to line 90, while line 92 is connected to the low-pressure sump (not shown) through line 94. Line 92 further contains a restriction orifice 98 and a check valve 100 piped in parallel to it. As shown in FIGS. 1–4, line 90 is connected to passage 40, while line 92 is connected to passage 38. During normal operations, there is always pressure in line 86. Thus, referring to FIGS. 1 and 2, the pressure from line 86 communicates through line 90 into passage 40. Thus, when the stepper shaft 42 is moved out of body 10, as shown by comparing the FIG. 1 position to the FIG. 2 position, the pressure from hydraulic pressure source 86 communicates through line 90 into passage 40, pressurizing cavity 58 and putting a force on surface 62 to make the actuator rod 32 follow the outward movement of the stepper shaft 42.

Regardless of the position of the stepper shaft 42, the hydraulic circuit illustrated in FIGS. 5 and 8 and applicable to the preferred embodiment shown in FIGS. 1–4, can be used to independently operate the actuator rod 32, independently from the stepper shaft 42. By the appropriate signal 96 to the diverter valve 88, the position in FIG. 8 is assumed. When that happens, the hydraulic pressure source 86 is connected to line 92. While some flow goes through orifice 98, most of the flow goes through the check valve 100, which allows flow in the direction away from diverter valve 88. Thus, pressure is communicated to cavity 64 and a force results on surface 62. In order to allow the actuator rod 32 to move downwardly, cavity 58 is connected through passage 40 and line 90 back to the low-pressure sump (not shown) through line 94. Accordingly, there is a quick stroking action imparted to actuator rod 32 when a signal 96 shifts the diverter valve 88 to the position shown in FIG. 8. This, in effect, pressurizes cavity 60 while depressurizing cavity 58, resulting in a stroking of the actuator rod 32 toward the left, moving the sleeve 20 over the openings 18, closing off the choke body 10.

Figure 3:
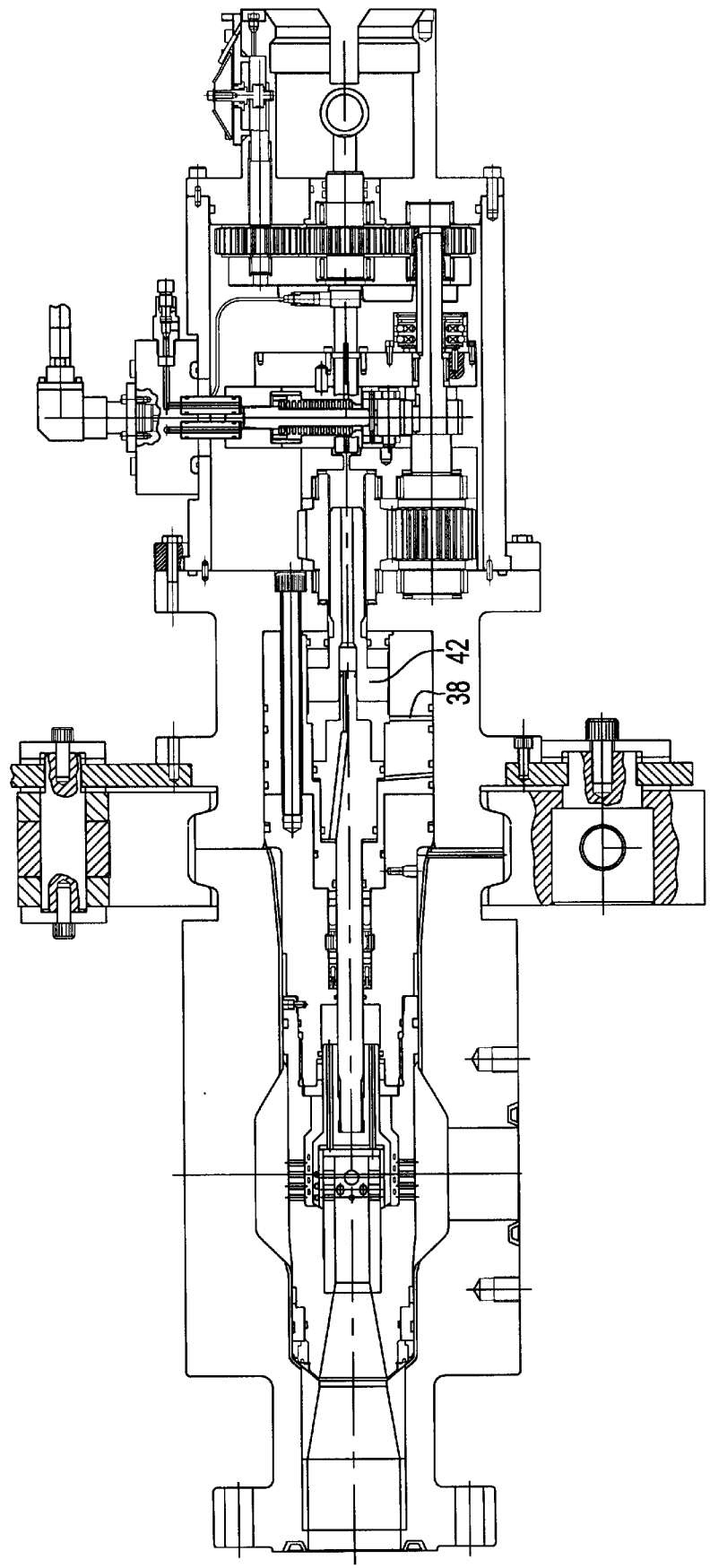
FIG. 3 is the view of FIG. 2, with the choke fully closed after it has been stepped half-closed.

After an emergency closure, should the choke need to be put back into service, signal 96 is removed from the diverter valve 88 allowing the spring 89 to put it back in the position shown in FIG. 5. Pressure from the source 86 is then applied to line 90. However, the check valve 100 does not permit flow back from cavity 60 toward the diverter valve 88. Hence, the only flow out of chamber 60 through passage 38 can occur through restrictor 98 which acts as a speed control device on movement of rod 32. This slows down the return movement of the actuator rod 32. Accordingly, the actuator rod 32 resumes its former position when it is fully in contact with the stepper shaft 42. It should be noted that the stepper shaft does not move when the signal 96 changes the position of diverter valve 88 from that shown in FIG. 5 to that shown in FIG. 8. Accordingly, when the signal is again given to the diverter valve 88 to go back to the position of FIG. 5, the actuator rod 32 resumes its former position against the stepper shaft 42, which in the interim during the emergency shutdown has not moved. FIG. 3 illustrates that the stepper shaft 42 is in the half-closed position, putting it about midway between the positions shown in FIGS. 1 and 2. It retains that position when the diverter valve 88 is switched to the position in FIG. 8 due to a signal 96. Thus, when an increase in pressure in passage 38 strokes the actuator rod 32 with respect to the stationary stepper shaft 42, the choke body 10 is closed between inlet 12 and outlet 14. The stroking of the actuator rod 32 displaces fluid from cavity or chamber 78 through passage 80 in the actuator rod 32 and through passage 82 in the stepper shaft 42, and eventually to the accumulator 84. In the FIG. 3 position, the actuator rod 32 will go back fully against the stepper shaft 42 when signal 96 again puts the diverter valve 88 in the position shown in FIG. 5.

Figure 4:
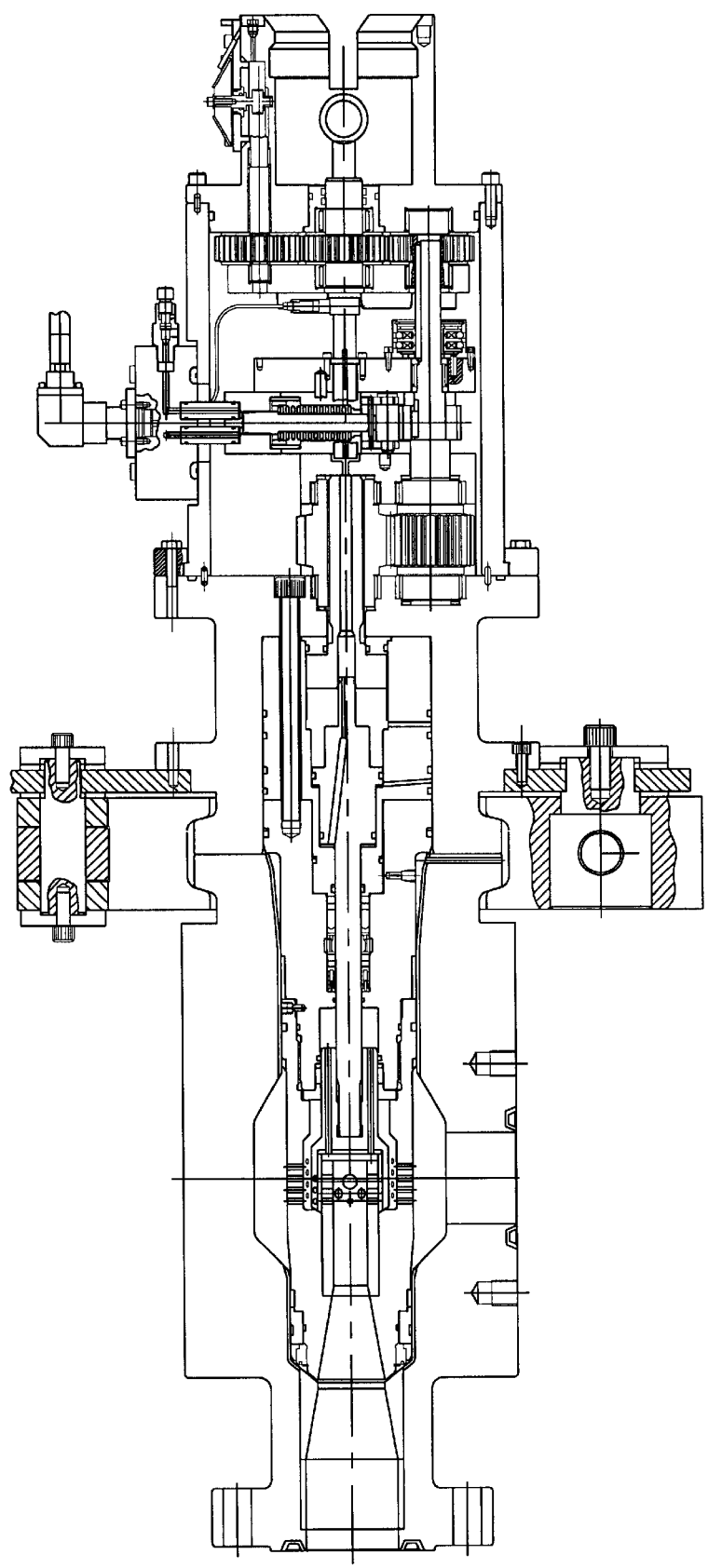
FIG. 4 is the view of FIG. 3, with the choke closed after being stepped fully open.
Figure 5:
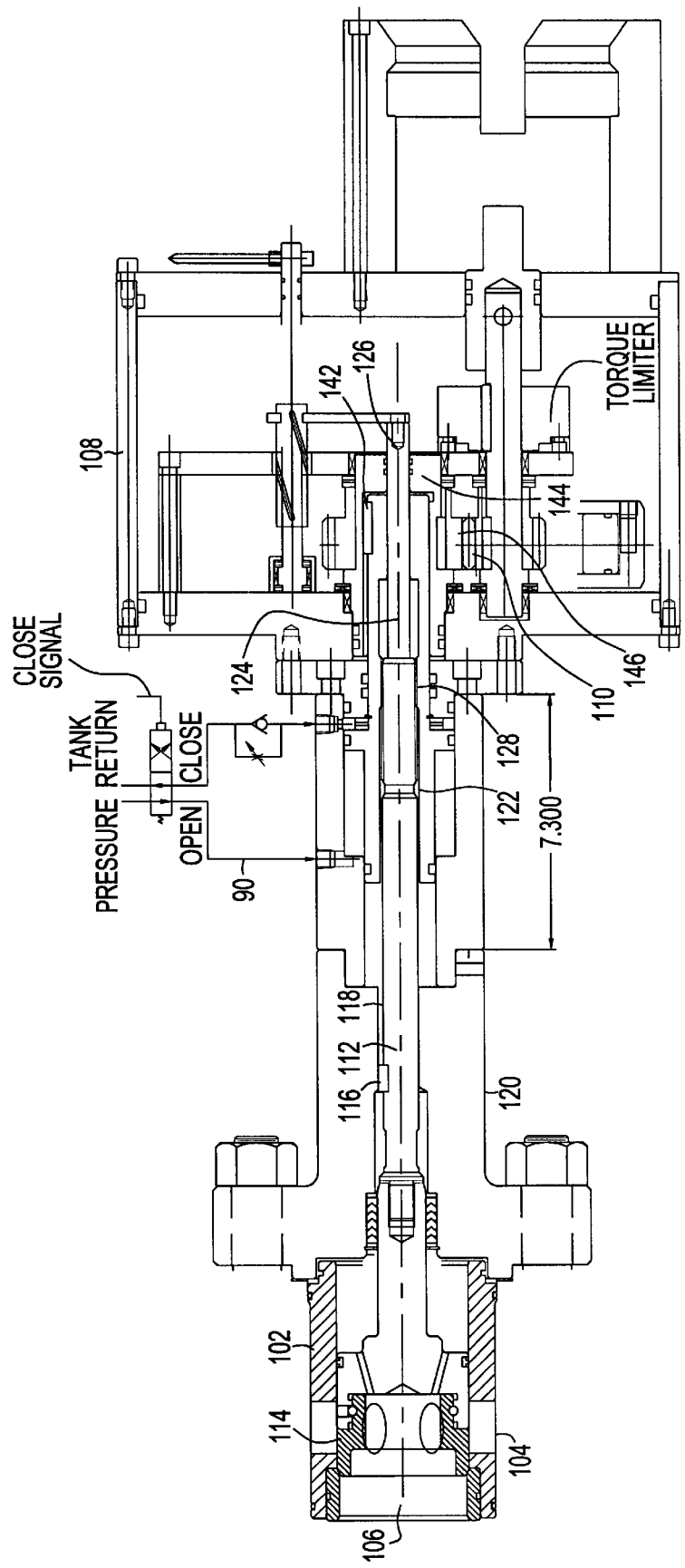
FIG. 5 is an alternative embodiment of the actuator for the choke, showing the choke stepped fully closed.

FIG. 4 shows the stepper shaft 42 in the full open position at the time a quick shutdown of the choke body 10 is required between inlet 12 and outlet 14. As a result, the stepper shaft 42 retains the same position it had in FIG. 2, while the hydraulic system, through a signal 96 and movement of the diverter valve 88, fully strokes the actuator rod 32 to isolate openings 18 with sleeve 20. Upon reversal of the position of the diverter valve 88 and again referring to FIG. 4, the actuator rod will move out of body 10 until contact with the stepper shaft 42.

Figure 6:
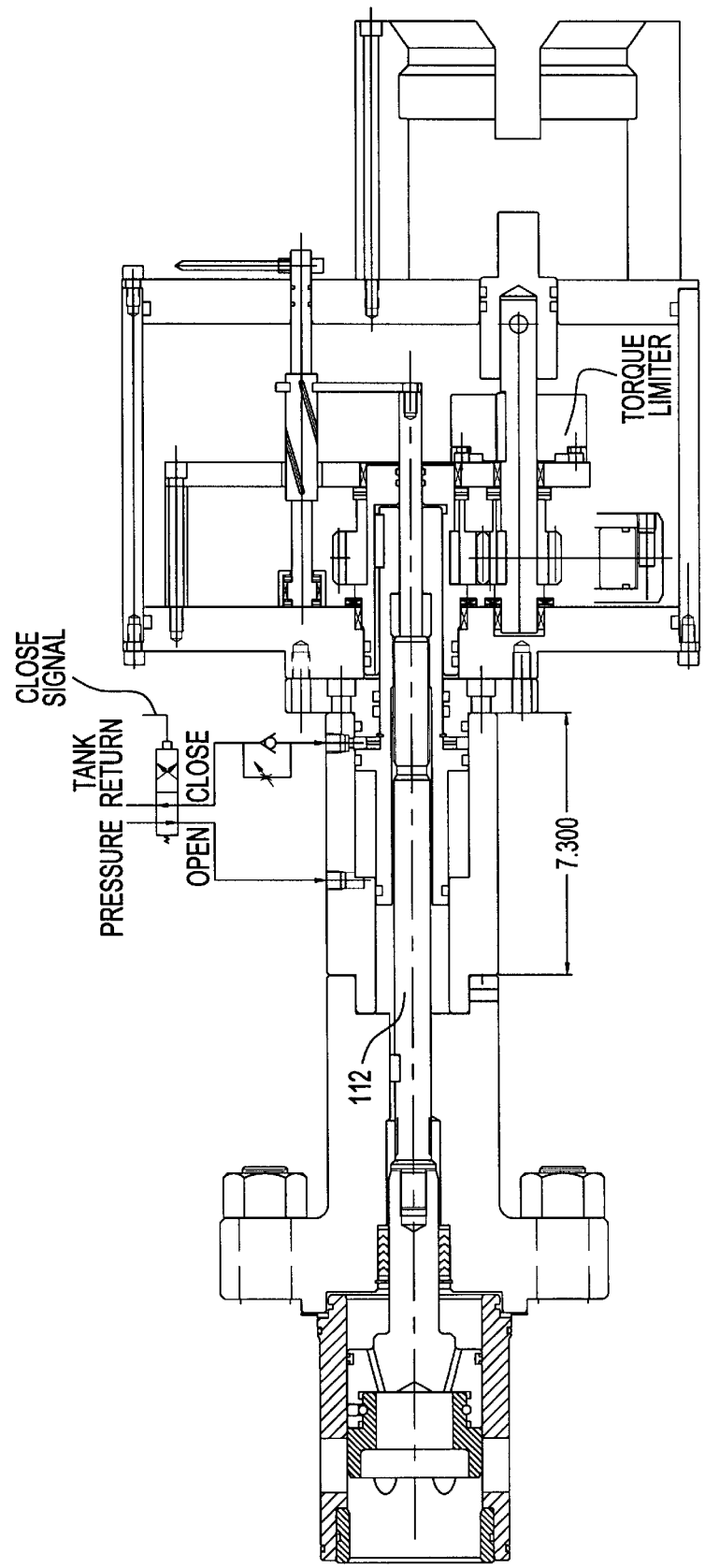
FIG. 6 is the view of FIG. 5, showing the choke stepped half-closed.
Figure 7:
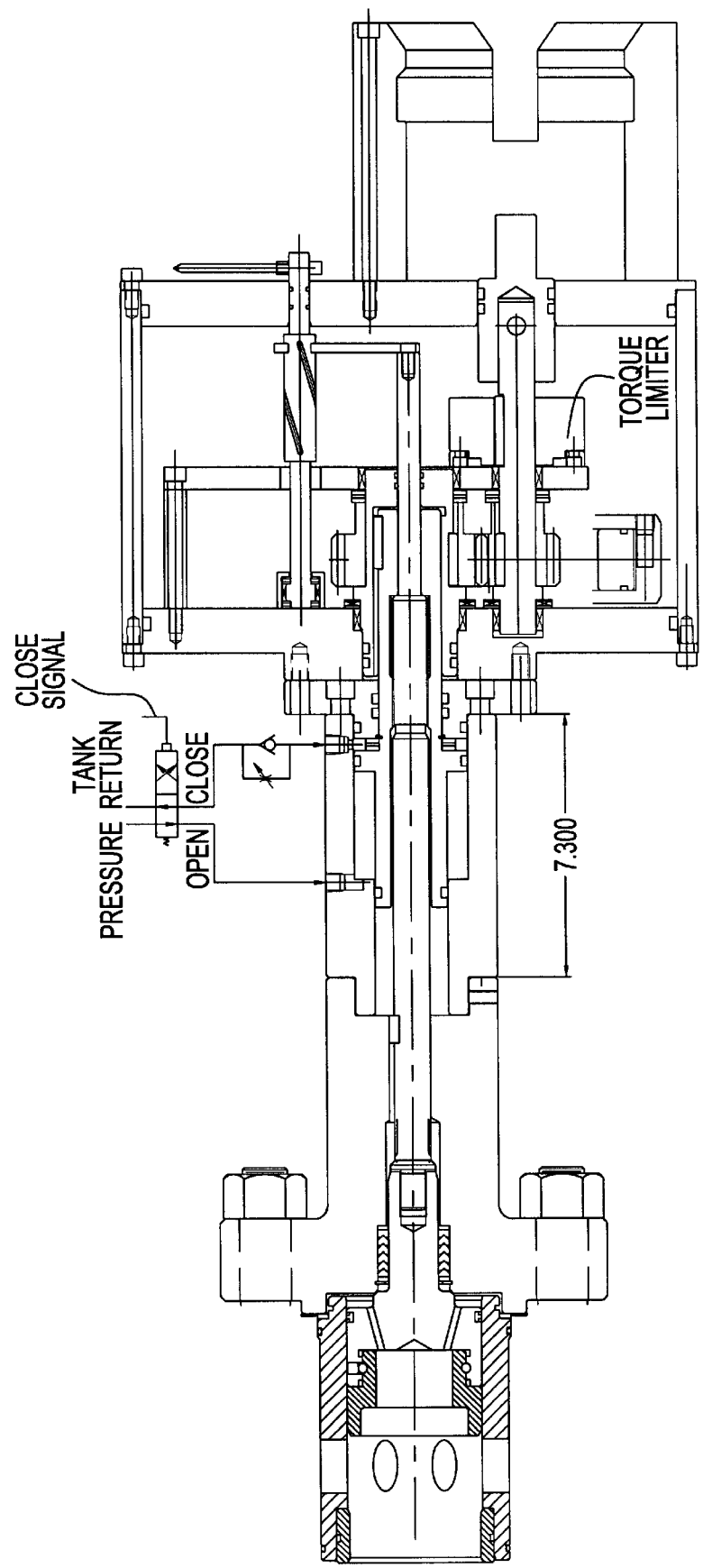
FIG. 7 is the view of FIG. 6, with the choke shown stepped fully open.

An alternative embodiment is illustrated in FIGS. 5–9. A choke body 102 has an inlet 104 and an outlet 106. An actuator 108 turns a gear 110 with a stepper motor in a manner known in the art. A stepper shaft 112 has the cage 114 connected at one end. A key 116 ensures that the stepper shaft 112 can only translate and not rotate. Key 116 is in groove 118 of body 120. The stepper shaft 112 extends through an actuator rod 122. Actuator rod 122 has a bore 124, through which extends end 126 of stepper shaft 112. Rotating with gear 110 is actuator rod 122. Since stepper shaft 112 is keyed for longitudinal movement by key 116, rotation of gear 110 with actuator rod 122 translates the stepper shaft 112. An engaging thread 128 between the actuator rod 122 and the stepper shaft 112 assures translation of stepper shaft 112 upon rotation of gear 110 with actuator rod 122. FIG. 5 shows the fully closed position, showing the stepper shaft 112 advanced most fully into body 102. In FIG. 6, the stepper shaft 112 has been moved somewhat out of body 102, while in FIG. 7, the full open position is illustrated. These movements are accomplished by stepwise actuation of gear 110 which rotates actuator rod 122 which, in turn, due to the presence of threads 128 translates the stepper shaft 112 which is keyed against rotation by key 116.

A rapid closure of the choke can be accomplished to put the cage 114 in the position shown in FIG. 8 by virtue of the hydraulic system previously described and shown in each of the FIGS. 5–9. In this situation, the actuator rod 122 has a surface 130 which, when pressure is exerted upon it and vented from cavity 132, creates the end result of movement of the actuator rod 122 toward the body 102. When this occurs, the actuator rod 122 is translated toward body 102 and takes with it the stepper shaft 112. Thus, comparing FIGS. 7 and 8, one can see that in FIG. 7, the stepper shaft 112 is in the fully open position, while in FIG. 8, with application of pressure into line 92 and onto surface 130, the net result has been that the actuator rod 122 has fully stroked, without rotation, taking with it the stepper shaft 112 to move the cage 114 from the fully open position shown in FIG. 7 to the fully closed position shown in FIG. 8. This is to be contrasted with the view in FIG. 9 where the cage 114 had previously been in the stepped half-closed position at the time pressure is applied in line 92 onto surface 130. Since the stepper shaft 112 was already in a half-closed position, the stroke of actuator rod 122 is shorter to close the choke in FIG. 9 than the stroke of the actuator rod in FIG. 8, where the choke was stepped full open prior to the rapid shutdown. Those skilled in the art will appreciate that upon reversal of the positions of the diverter valve 88 in the embodiment and position shown in FIG. 9, the stepper shaft 112 will simply move back, but at a slower rate, in tandem with the actuator rod 122 until the actuator rod can no longer move. Thus, the position of FIG. 6 will result after operation of the diverter valve 88 in progressing from the position of FIG. 9 back to the position of FIG. 6.

One of the disadvantages of the embodiment shown in FIGS. 5–9 is that the seals 134 and 138 mounted to the actuator rod 122 rotate with respect to housing 140. This could cause wear on the seals which will require maintenance. Additionally, assembly is more difficult in the design of FIGS. 5–9 because alignment is required among key 116 on stepper shaft 112, threads 128 between stepper shaft 112 and actuator rod 122, and a key 142 which secures the actuator rod 122 to sleeve 144 which, through a gear 146 is meshed to gear 110. Thus, the design of FIGS. 5–9 is more difficult to assemble and may require incrementally more maintenance than the design in FIGS. 1–4.

In all other respects, the actuator 108 comprises a design that is known in the art, having such well-known features as a position indicating mechanism 148.

Those skilled in the art will appreciate that the advantage of the present invention allows for rapid closure of the choke and a resumption of the original position of the cage after the rapid shutdown. The actuation mechanism can be used for devices other than chokes without departing from the spirit of the invention. Thus, other styles of control valves, used both in surface systems and downhole, can employ the rapid shutdown feature described. Although a stepper motor operation has been described as being incorporated into the actuator, other types of normal movement can be employed without departing from the spirit of the invention.

The foregoing disclosure and description of the invention are illustrative and explanatory thereof, and various changes in the size, shape and materials, as well as in the details of the illustrated construction, may be made without departing from the spirit of the invention.

What is claimed is:

1. An actuator for a valve member, selectively movable in a valve body between open and closed positions, comprising:

a. a housing;
   b. a stepper motor having an output shaft movable in predetermined increments;
   c. a stepper shaft operably connected to said output shaft such that rotation of said output shaft moves said stepper shaft;
   d. an actuator member connectable to the valve member to selectively actuate the valve member, regardless of the position of the valve member, to a closed position by application of fluid pressure to allow said valve member to move independently of said stepper shaft.

2. The actuator of claim 1, wherein:
   said actuator member selectively translates with respect to said stepper shaft.

3. The actuator of claim 2, wherein:
   said actuator member is in contact with said stepper shaft for tandem movement responsive to movement of said output shaft.

4. The actuator of claim 3, wherein:
   said actuator member, responsive to a first applied force, translates the valve member toward its closed position without movement of said stepper shaft.

5. The actuator of claim 4, wherein:
   said actuator member, responsive to a second applied force, returns the valve member to the position it had prior to application of said first applied force.

6. An actuator for a valve member, selectively movable in a valve body between open and closed positions, comprising;

a. a housing;
   b. a stepper motor having an output shaft movable in predetermined increments;
   c. a stepper shaft operably connected to said output shaft such that rotation of said output shaft moves said stepper shaft;
   d. an actuator member connectable to the valve member to selectively actuate the valve member independently of said stepper shaft;
   e. said actuator member selectively translates with respect to said stepper shaft;
   f. said actuator member is in contact with said stepper shaft for tandem movement responsive to movement of said output shaft;
   g. said actuator member, responsive to a first applied fluid pressure force, translates the valve member toward its closed position without movement of said stepper shaft;

h. said actuator member, responsive to a second applied force, returns the valve member to the position it had prior to application of said first applied force; and i. the position of said stepper shaft defines the travel stop for said actuator member responsive to said second applied force.

7. An actuator for a valve member, selectively movable in a valve body between open and closed positions, comprising:

a. a housing;

b. a stepper having an output shaft movable in predetermined increments;

c. a stepper motor shaft operably connected to said output shaft such that rotation of said output shaft moves said stepper shaft;

d. an actuator member connectable to the valve member to selectively actuate the valve member independently of said stepper shaft;

e. said actuator member selectively translates with respect to said stepper shaft;

f. said translation is in opposed directions responsive to applied opposing forces;

g. said actuator member further comprising a speed control device on said body to regulate movement of said actuator member in at least one direction.

8. An actuator for a valve member, selectively movable in a valve body between open and closed positions, comprising:

a housing;

a stepper motor having an output shaft movable in predetermined increments;

a stepper shaft operably connected to said output shaft such that rotation of said output shaft moves said stepper shaft;

an actuator member connectible to the valve member to selectively actuate the valve member independently of said stepper shaft;

said actuator member selectively translates with respect to said stepper shaft;

said translation is in opposed directions responsive to an applied force;

said actuator member further comprising a speed control device to regulate, by regulating said applied force, movement of said actuator member in at least one direction;

said applied force comprises a fluid force selectively applied to one of two opposing surfaces on said actuator member, whereupon movement of said actuator member in one of said directions is regulated by limitation of the rate of fluid displaced by one of said opposing surfaces.

9. The actuator of claim 8, wherein:

said opposing surfaces form part of a reversible hydraulic circuit comprising sealed chambers defined by said opposing surfaces, said sealed chambers each comprising an inlet, whereupon pressure applied to a first inlet forces said actuator member into contact with said stepper motor, said force being overcome by said stepper shaft for tandem movement of said stepper shaft and actuator member to step the valve member toward its closed position.

10. The actuator of claim 9, wherein:

pressure applied to a second inlet forces said actuator member away from said stepper shaft for moving the valve member toward a closed position.

11. The actuator of claim 9, wherein:

said speed control device in said hydraulic circuit comprises a restriction and a check valve connected in parallel, whereupon pressure in one direction allows in unrestricted flow through said check valve, while pressure in an opposite direction closes said check valve, requiring flow through said restriction whereupon movement of said actuator member is restricted by said orifice as the valve member moves toward its open position.

12. The actuator of claim 6, wherein:

said fluid pressure comprises a hydraulic circuit with a flow restriction in one direction to regulate movement of said actuator member and the valve member going from the closed toward the open position of the valve member.

13. The actuator of claim 12, further comprising:

a check valve mounted in parallel with said flow restriction so as to bypass said flow restriction for movement of the actuator member and valve member toward the closed position of the valve member.

14. An actuator for a valve member, selectively movable in a valve body between open and closed positions, comprising:

a. a housing;

b. a stepper motor having an output shaft movable in predetermined increments;

c. a stepper shaft operably connected to said output shaft such that rotation of said output shaft moves said stepper shaft;

d. an actuator member connectible to the valve member to selectively actuate the valve member independently of said stepper shaft;

e. said actuator member selectively translates with respect to said stepper shaft; and f. said stepper shaft guided in said housing to limit its movements to opposed translation.

15. An actuator for a valve member selectively movable in a valve body between open and closed positions, comprising:

a housing;

a stepper motor having an output shaft movable in predetermined increments;

a stepper shaft connected to the valve member;

an actuator member movable by said output shaft and operably connected to said stepper shaft to selectively create relative movement between said stepper shaft and said actuator member for incremental movements of the valve member between its open and closed positions;

said actuator member selectively actuable by a fluid pressure force for tandem movement with said stepper shaft while engaged thereto for rapid movement of the valve member toward its closed position.

16. The actuator of claim 15, wherein:

said actuator member connected to said output shaft in a manner that allows rotation in tandem as well as relative longitudinal reciprocation of said actuator member with respect to said output shaft.

17. The actuator of claim 16, wherein:

said stepper shaft is guided in said housing to translate without rotation;

said actuator member and said stepper shaft connected by a drive thread such that rotation of said actuator member translates said stepper shaft selectively in opposed directions, while translation of said actuator member translates said stepper shaft in tandem.

18. An actuator for a valve member selectively movable in a valve body between open and closed positions, comprising:

a housing;

a stepper motor having an output shaft movable in predetermined increments;

a stepper shaft connected to the valve member;

an actuator member movable by said output shaft and operably connected to said stepper shaft to selectively create relative movement between said stepper shaft and said actuator member for incremental movements of the valve member between its open and closed positions;

said actuator member selectively actuable for tandem movement with said stepper shaft for rapid movement of the valve member toward its closed position;

said actuator member connected to said output shaft in a manner that allows rotation in tandem as well as relative longitudinal reciprocation of said actuator member with respect to said output shaft;

said stepper shaft is guided in said housing to translate without rotation;

said actuator member and said stepper shaft connected by a drive thread such that rotation of said actuator member translates said stepper shaft selectively in opposed directions, while translation of said actuator member translates said stepper shaft in tandem;

said actuator member is powered by a fluid circuit to translate in opposed directions by fluid pressure.

19. The actuator of claim 18, wherein:

said powered movement of said actuator member is faster when moving the valve member toward its closed position due to bypassing a flow restriction which regulates movement of the valve member toward its open position.

* * * * *